(12) United States Patent
Umayahara

(10) Patent No.: US 8,853,989 B2
(45) Date of Patent: Oct. 7, 2014

(54) FUEL CELL SYSTEM AND MOTOR DRIVING METHOD

(75) Inventor: Kenji Umayahara, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 474 days.

(21) Appl. No.: 13/122,636

(22) PCT Filed: Jul. 9, 2009

(86) PCT No.: PCT/JP2009/062549
§ 371 (c)(1),
(2), (4) Date: Apr. 5, 2011

(87) PCT Pub. No.: WO2011/004487
PCT Pub. Date: Jan. 13, 2011

(65) Prior Publication Data
US 2011/0187298 A1    Aug. 4, 2011

(51) Int. Cl.
*H02P 27/04* (2006.01)
*H01M 8/04* (2006.01)
*B60L 11/18* (2006.01)

(52) U.S. Cl.
CPC ............ *H01M 8/04567* (2013.01); *Y02E 60/50* (2013.01); *H01M 8/04888* (2013.01); *Y02T 90/34* (2013.01); *B60L 11/1887* (2013.01); *B60L 11/1892* (2013.01)
USPC ............... 318/801; 318/139; 363/40; 363/55; 320/101; 320/104; 429/22; 429/23

(58) Field of Classification Search
CPC ................. H02P 27/08; H02P 27/06
USPC ........ 318/139, 800, 801, 799, 432; 180/65.8; 320/101, 103, 104; 429/23, 34, 415, 429/432, 22; 363/40, 55
See application file for complete search history.

(56) References Cited

U.S. PATENT DOCUMENTS

| | | | |
|---|---|---|---|
| 6,920,948 B2 * | 7/2005 | Sugiura et al. | 180/65.28 |
| 7,402,967 B2 * | 7/2008 | Kurosawa | 318/139 |
| 7,436,148 B2 * | 10/2008 | Saeki et al. | 320/104 |
| 7,449,798 B2 * | 11/2008 | Suzuki et al. | 307/65 |
| 8,018,196 B2 * | 9/2011 | Sugiura et al. | 320/104 |
| 2007/0018607 A1 * | 1/2007 | Kurosawa | 320/103 |

FOREIGN PATENT DOCUMENTS

| | | |
|---|---|---|
| DE | 102007024567 A1 | 11/2008 |
| JP | 2005-348530 A | 12/2005 |
| JP | 2007-318938 A | 12/2007 |
| JP | 2008-91319 A | 4/2008 |
| JP | 2009-142098 A | 6/2009 |

* cited by examiner

*Primary Examiner* — Antony M Paul
(74) *Attorney, Agent, or Firm* — Kenyon & Kenyon LLP

(57) ABSTRACT

A motor can be driven while reducing the power loss of the entire system where a plurality of devices that causes power losses exists. The system is provided with an inverter connected to a motor, a first converter that is connected between a fuel cell and the inverter and sets an output voltage of the fuel cell, a second converter that is connected between a power storage device and the inverter and sets an input voltage $V_{in}$ of the inverter, and a controller that controls the first converter and the second converter. Under the operating condition (torque, number of revolutions) required for the motor, an input voltage of the inverter which minimizes a power loss of at least one of the motor, the first converter, the second converter and the inverter is determined, and the determined input voltage is output as a necessary voltage for the inverter.

14 Claims, 9 Drawing Sheets

FUEL CELL SYSTEM AND MOTOR DRIVING METHOD

This is a 371 national phase application of PCT/JP2009/062549 filed 9 Jul. 2009, the content of which is incorporated herein by reference.

TECHNICAL FIELD

The present invention relates to a fuel cell system installed in a vehicle, and particularly relates to a hybrid fuel cell system that supplies power to a motor for driving a vehicle from a fuel cell and a battery.

BACKGROUND ART

In vehicles equipped with fuel cell systems (hereinafter referred to as "fuel cell vehicles"), a plurality of power devices is used in order to supply power from a fuel cell and a power storage device to a motor. A DC-DC converter is a power device that converts a voltage between the fuel cell and an inverter. An inverter is a power device that converts a DC input voltage to an alternating-current voltage and supplies it to a motor. Also, there is a system in which, in addition to the above DC-DC converter, another DC-DC converter is provided between a power storage device and an inverter. In such fuel cell vehicles, power losses are caused in the power devices including the motor, and therefore, reductions in power losses have been demanded.

For example, JP2005-348530 A discloses an invention in which an output voltage value of a fuel cell is set to between the maximum value and the minimum value of a circuit voltage of a power storage device, thereby decreasing the frequency of voltage conversion operations, leading to the suppression of increases in power losses.

CITATION LIST

Patent Literature

[PTL 1]
Patent Document 1: JP2005-348530 A

SUMMARY OF THE INVENTION

Technical Problem

However, in a fuel cell vehicle, power losses are also caused in an inverter for driving a motor, the motor, etc. In Patent Literature 1 above, the power losses of the inverter, the motor, etc., have not been considered.

When a plurality of components that cause power losses exists, a fuel cell system needs to be controlled so as to minimize the power losses in those components.

In order to solve the above-mentioned problem, provided according to a preferred aspect of the invention are a fuel cell system and a motor driving method that enable driving a motor while reducing the power loss of the entire system when a plurality of components that cause power losses exists.

Solution to Problem

According to an aspect of the invention, a fuel cell system that solves the problem above comprises: a fuel cell system including: an inverter connected to a motor; a first converter that is connected between a fuel cell and the inverter and sets an output voltage of the fuel cell; a second converter that is connected between a power storage device and the inverter and sets an input voltage of the inverter; and a controller that controls the first converter and the second converter, wherein an input voltage of the inverter which minimizes a power loss of at least one of the motor, the first converter, the second converter and the inverter under an operating condition required for the motor is determined, and the input voltage of the inverter which minimizes the power loss is output as a necessary voltage for the inverter.

According to an aspect of the invention, in a fuel cell system that solves the problem above, the system being provided with: an inverter connected to a motor; a first converter that is connected between a fuel cell and the inverter and sets an output voltage of the fuel cell; a second converter that is connected between a power storage device and the inverter and sets an input voltage of the inverter; and a controller that controls the first converter and the second converter, the fuel system comprises: a minimum loss voltage determination unit that determines an input voltage of the inverter which minimizes a power loss of at least one of the motor, the first converter, the second converter and the inverter under an operating condition required for the motor; and a necessary voltage output unit that outputs the input voltage of the inverter which minimizes the power loss as a necessary voltage for the inverter.

According to an aspect of the invention, a motor driving method that solves the problem above for a fuel cell system provided with: an inverter connected to a motor; a first converter that is connected between a fuel cell and the inverter and sets an output voltage of the fuel cell; a second converter that is connected between a power storage device and the inverter and sets an input voltage of the inverter; and a controller that controls the first converter and the second converter, comprises the steps of: determining an input voltage of the inverter which minimizes a power loss of at least one of the motor, the first converter, the second converter and the inverter under an operating condition required for the motor; and outputting the input voltage of the inverter which minimizes the power loss as a necessary voltage for the inverter.

In a fuel cell vehicle, the operating condition required for the motor (e.g., torque or number of revolutions of the motor in an embodiment) is set. For each of the motor, the first converter, the second converter and the inverter, the input voltage of the inverter which minimizes the power loss in accordance with the operating condition for the motor may be preset through experiments, etc. According to such an invention, the input voltage of the inverter which minimizes the power loss of at least one of the motor, the first converter, the second converter and the inverter is determined, and the determined input voltage serves as the necessary voltage for the inverter. Accordingly, this enables motor driving with a reduced power loss of the system.

The respective power losses are preferably obtained for all of the power devices (motor, first converter, second converter and inverter), but the power losses may differ depending on the passing power, etc., between the motor, the first converter, the second converter and the inverter. In this case, even if the input voltage of the inverter which minimizes the power loss is determined regarding one or two of the power devices particularly having a large power loss, this leads to a significant effect of the reduction in the power loss. Accordingly, the power loss of the entire system can be reduced.

In an aspect of the fuel cell system, it is preferable that, when the input voltage of the inverter which minimizes the power loss is smaller than an input voltage of the inverter which provides a necessary voltage for the motor under the operating condition required for the motor, the input voltage of the inverter which provides the necessary voltage for the motor is output as the necessary voltage for the inverter.

Also, in an aspect of the fuel cell system, it is preferable that the system further comprises a lower-limit setting unit that outputs, when the voltage of the inverter which minimizes the power loss is smaller than an input voltage of the inverter which provides a necessary voltage for the motor under the operating condition required for the motor, the input voltage of the inverter which provides the necessary voltage for the motor as the necessary voltage for the inverter.

Also, in an aspect of the driving control method, it is preferable that the method further comprises the step of outputting, when the input voltage of the inverter which minimizes the power loss is smaller than an input voltage of the inverter which provides a necessary voltage for the motor, the input voltage of the inverter which provides the necessary voltage for the motor as the necessary voltage for the inverter.

A motor has a minimum necessary voltage for maintaining stable driving. With such a configuration, when the input voltage of the inverter which minimizes the power loss is below the input voltage of the inverter which provides the necessary voltage for the motor, the input voltage of the inverter which provides the necessary voltage for the motor is output as the necessary voltage for the inverter. Accordingly, the relevant torque is not limited more than necessary, which enables the operating state of the motor to be maintained stably.

The present invention may selectively and additionally include features below as desired.

(1) The input voltage of the inverter which minimizes the power loss may be determined by referring to a relation table in which the input voltage of the inverter which minimizes a power loss is mapped regarding at least one of the first converter, the second converter and the inverter, the power loss varying in accordance with the operating condition for the motor.

With such a configuration, regarding at least one of the power devices such as the motor, the first converter, the second converter and the inverter, the input voltage of the inverter which indicates the minimum power loss in accordance with the operating condition for the motor is measured, and the measured input voltage is mapped in the relation table. By referring to the relation table, the input voltage of the inverter which minimizes the power loss in accordance with the operating condition for the motor can be acquired easily.

Note that the relation table may be provided for each of the power devices. Also, a relation table may be provided for a plurality of voltage exchangers. Such a relation table records the input voltage of the inverter which minimizes the total power loss of the power devices serving as objects in accordance with the operating condition for the motor.

(2) An input voltage of the inverter which minimizes the total power loss of the motor, the first converter, the second converter and the inverter under the operating condition required for the motor may be determined.

With such a configuration, the input voltage of the inverter which minimizes the total power loss of the motor, the first converter, the second converter and the inverter is determined. Accordingly, this enables motor driving with the minimum power loss of the entire system.

Note that the total power loss may be determined based on the input voltages of the inverter which minimize the power losses of the respective power devices. For example, the input voltages of the inverter which minimize the power losses of the respective power devices may be compared to one another to determine the highest voltage or the lowest voltage as the necessary voltage for the inverter. Also, the inverter-necessary voltage may be determined by obtaining the average value of the input voltages of the inverter which minimize the voltage losses of the respective power devices or computing the relevant weighted average, etc., in accordance with the power losses.

(3) The input voltage of the inverter which minimizes the power loss may be determined by referring to a relation table in which the input voltage of the inverter which minimizes the total power loss of the motor, the first converter, the second converter and the inverter is mapped, the total power loss varying in accordance with the operating condition for the motor.

With such a configuration, the input voltage of the inverter which indicates the minimum power loss in accordance with the operating condition for the motor is measured for all of the motor, the first converter, the second converter and the inverter, and the measured input voltage is mapped in the relation table. By referring to the relation table, the input voltage of the inverter which minimizes the power loss in accordance with the operating condition for the motor can be acquired easily.

Note that the relation table records the input voltage of the inverter which minimizes the total power loss of all the power devices in accordance with the operating condition for the motor.

(4) The necessary voltage for the inverter may be determined by referring to a relation table in which the input voltage of the inverter which provides the necessary voltage for the motor is mapped, the input voltage varying in accordance with the operating condition for the motor.

With such a configuration, the input voltage of the inverter which provides the necessary voltage for the motor is measured in advance in accordance with the operating condition for the motor, and the measured input voltage is mapped in the relation table. By referring to the relation table, the input voltage of the inverter which provides the necessary voltage for the motor in accordance with the operating condition for the motor can be acquired easily.

(5) A fuel cell system may be provided comprising: an inverter connected to a motor; a first converter that is connected between a fuel cell and the inverter and sets an output voltage of the fuel cell; a second converter that is connected between a power storage device and the inverter and sets an input voltage of the inverter; and a controller that controls the first converter and the second converter, wherein an input voltage of the inverter which minimizes a power loss of at least one of the motor, the first converter, the second converter and the inverter under an operating condition required for the motor and which is equal to or higher than a necessary voltage for the motor under the operating condition required for the motor is determined so as to be output as a necessary voltage for the inverter.

With such a configuration, when the operation condition required for the motor is set, the relevant input voltage of the inverter which minimizes the power loss of the power device and which is equal to or higher than the necessary voltage for the motor is determined. Accordingly, the necessary voltage for the inverter can be output by one-time computation or judgment processing.

(6) The necessary voltage for the inverter may be determined by referring to a relation table in which an input voltage of the inverter which minimizes the total power loss of the motor, the first converter, the second converter and the inverter and which is equal to or higher than the necessary voltage for the motor is mapped, the input voltage varying in accordance with the operating condition for the motor.

With such a configuration, the input voltage of the inverter which indicates the minimum power loss in accordance with the operating condition for the motor is measured for all the power devices, and the measured input voltage of the inverter which indicates the minimum power loss is subjected to lower limit processing so as to be equal to or higher than the input voltage of the inverter which provides the necessary voltage for the motor, and the resultant voltage is mapped in the relation table. By referring to the relation table, the necessary voltage for the inverter can be uniquely determined in accordance with the operating condition for the motor, which makes performing the judgment processing remarkably easy.

Note that the relation table records the voltage obtained by subjecting the input voltage of the inverter which minimizes the total power loss of all the power devices in accordance with the operating condition for the motor to lower limit processing so as to make that input voltage equal to or higher than the input voltage of the inverter which provides the necessary voltage for the motor.

(7) The fuel cell system may further comprises an auxiliary inverter connected, in parallel with the inverter, with respect to the second converter, wherein the input voltage of the inverter which minimizes the power loss under the operating condition required for the motor is determined, the input voltage further reflecting a power loss of the auxiliary inverter.

With such a configuration, the input voltage of the inverter is determined so as to further minimize the power loss of the auxiliary inverter. Therefore, the total power loss that also covers the auxiliary inverter can be reduced.

Advantageous Effects of Invention

According to the present invention, a motor can be driven while reducing the entire power loss even where a plurality of components that causes power losses exists.

DESCRIPTION OF EMBODIMENTS

Figure 1:
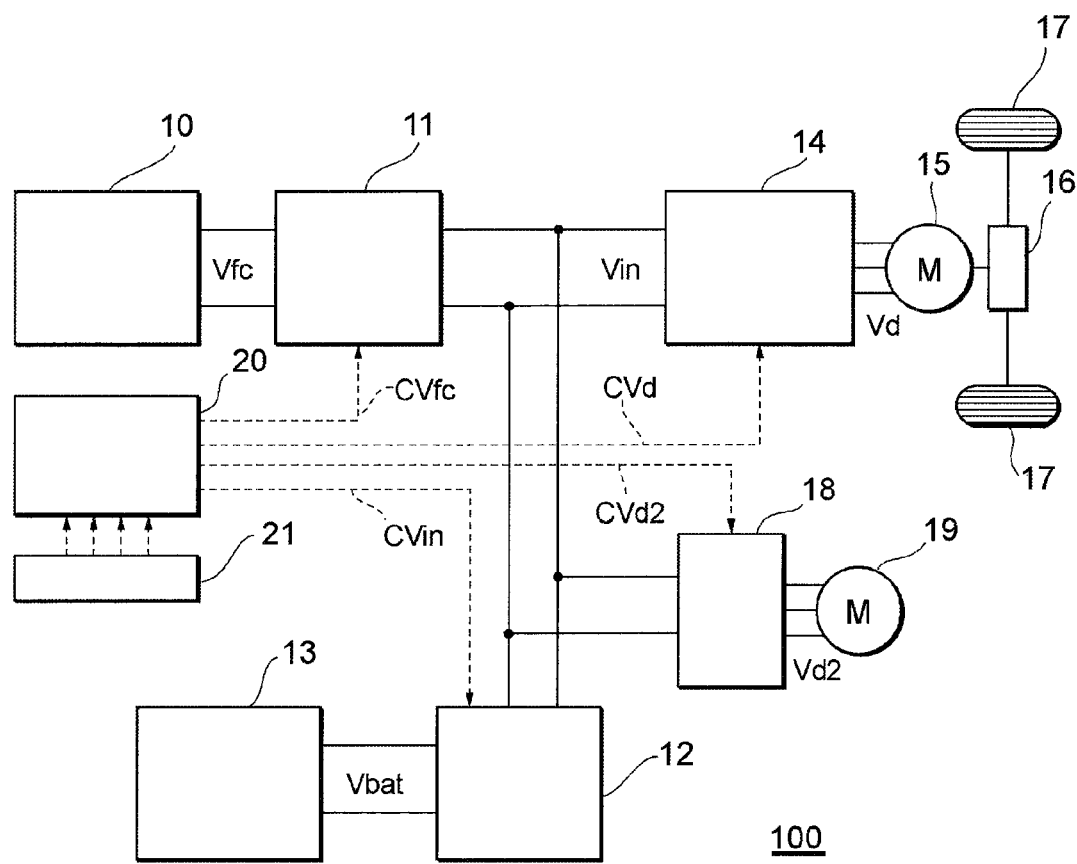
FIG. 1 is a system configuration diagram of an FCHV system according to embodiment 1.

Next, preferred embodiments for carrying out the present invention will be described with reference to the accompanying drawings.

In the drawings, the same or similar parts are denoted by the same or similar symbols. However, the drawings are schematic ones, and therefore, the relevant specific characteristics, etc., should be judged in light of the descriptions below. Also, it is obvious that different characteristics of a part are included between the drawings.

Embodiment 1

Embodiment 1 relates to an embodiment of holding a relation table for obtaining the minimum power loss, the relation table being associated with individual power devices.

(System Configuration)

FIG. 1 is a block diagram of a fuel cell system 100 installed in a vehicle according to embodiment 1. Such a vehicle is a hybrid-type fuel cell vehicle (FCHV: Fuel Cell Hybrid Vehicle).

The fuel cell system 100 includes a fuel cell 10, a first converter 11, a second converter 12, a battery 13, an inverter 14, a motor 15, an auxiliary inverter 18 and a controller 20.

The fuel cell 10 is a power generation unit formed of a plurality of unit cells stacked in series. The unit cell has a configuration in which: an ion exchange film such as a polymer electrolyte membrane is interposed between an anode and a cathode to form an MEA (Membrane Electrode Assembly); and the MEA is interposed between separators. In the anode, an anode catalyst layer is provided on a porous support layer, and in the cathode, a cathode catalyst layer is provided on a porous support layer. To the anode of each unit cell, a fuel gas (e.g., hydrogen gas) is supplied from a fuel gas supply system (not shown) through the relevant separator. To the cathode of each unit cell, an oxidant gas (e.g., air) is supplied from an oxidant gas supply system (not shown) through the separator. The separators each are provided with flow paths for a coolant, and the coolant is supplied to the separators from a coolant supply system (not shown). In the fuel cell 10, the oxidization reaction represented by formula (1) occurs at the anode, and the reduction reaction represented by formula (2) occurs at the cathode. The electromotive reaction represented by formula (3) occurs in the entire fuel cell 10.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

The plurality of unit cells connected in series allows the fuel cell 10 to output an output voltage Vfc at an output terminal. The fuel cell 10 has predetermined current-voltage output characteristics, and the output current and output power vary in accordance with the variation of the output voltage Vfc.

The first converter 11 is one of power devices, and has a configuration of a DC-DC converter. When employing a three-phase operation system, the first converter 11 has a circuit configuration of, e.g., a three-phase bridge type converter. The three-phase bridge type converter is provided with a reactor, a rectification diode and a switching element such as an IGBT (Insulated Gate Bipolar Transistor). These elements are combined, thereby forming a circuit portion similar to an inverter, which temporarily converts an input direct-current voltage to an alternating current, and a portion that rectifies the alternating current again and converts it to a different direct-current voltage. The circuit configuration of the first converter 11 is not intended to be limited to the one above, and any configuration that can control the output voltage Vfc of the fuel cell 10 may be employed.

In the first converter 11, the output terminal of the fuel cell 10 is connected to the primary side, and an input terminal of the inverter 14 is connected to the secondary side. The first converter 11 is configured to control a primary-side terminal voltage (output voltage Vfc of the fuel cell 10) in accordance with a command CVfc from the controller 20. More specifically, the first converter 11 controls the output voltage Vfc of the fuel cell 10 to be a voltage in accordance with a target output (i.e., target output voltage Vfc). Also, the first converter 11 is configured to perform voltage conversion such that the output voltage Vfc of the fuel cell 10 matches with an input voltage Vin of the inverter 14.

The battery 13 is a power storage device, and functions as a storage source of surplus power of the power generated by the fuel cell 10, a storage source of regenerated energy during regeneration braking, and an energy buffer during a load variation as a result of acceleration or deceleration of a fuel cell vehicle. A secondary battery such as a nickel/cadmium battery, a nickel/hydrogen battery or a lithium secondary battery is used as the battery 13. An output voltage Vbat of the battery 13 serves as an input voltage of the second converter 12.

The second converter 12 is one of the power devices, and has a configuration of a DC-DC converter as with the first converter 11. In the secondary converter 12, an output terminal of the battery 13 is connected to the primary side, and the input terminal of the inverter 14 is connected to the secondary side. The second converter 12 is configured to control a secondary-side terminal voltage (input voltage Vin of the inverter 14) in accordance with a command CVin from the controller 20. For example, when request power of the motor rapidly changes (hereinafter the increase of the request power is assumed), the second converter 12 controls the input voltage Vin of the inverter 14 to be a predetermined target input voltage. Also, the first converter 11 controls the output voltage Vfc of the fuel cell 10 to be a preset target output voltage. Note that, as to the circuit configuration of the second converter 12, any configuration that can control the input voltage Vin of the inverter 14 may be employed.

The inverter 14 is one of the power devices, and is configured to convert a direct current supplied to the input terminal to an alternating current and supply it to the motor 15. The circuit configuration of the inverter 14 includes, e.g., a PWM circuit driven by a pulse width modulation method. The inverter 14 is configured to supply, to the motor 15, a three-phase alternating current drive voltage Vd in accordance with the input voltage Vin controlled by the second converter 12.

The motor 15 is one of the power devices (load device), and is a traction motor for vehicle driving, providing a driving power to the vehicle when a drive power is supplied and generating regenerated power when the vehicle is decelerated. A differential 16 is a decelerator, which is configured to decelerate a high-speed rotation of the motor 15 at a predetermined ratio and rotate a shaft to which tires 17 are provided. The shaft has a wheel speed sensor (not shown), etc., thereby detecting the speed of the vehicle.

The auxiliary inverter 18 is one of the power devices, and is configured to convert a direct current supplied to an input terminal thereof to an alternating current and supply it to a high-voltage auxiliary apparatus 19. The circuit configuration of the auxiliary inverter 18 is the same as the inverter 14. The auxiliary inverter 18 is configured to supply a three-phase alternating current having a predetermined drive voltage Vd2 (effective value) to the high-voltage auxiliary apparatus 19 in accordance with a command CVd2 given from the controller 20. Note that the high-voltage auxiliary apparatus 19 is one of the load devices (power devices), and is a generic name for a humidifier, air compressor, hydrogen pump, coolant pump, etc., (not shown) for functioning the fuel cell system 100.

The controller 20 is a computer system for controlling the fuel cell system 100, and has a CPU, RAM, ROM, etc. The controller 20 receives, as inputs, various signals (e.g., a signal representing an acceleration opening degree, a signal representing a vehicle speed, and a signal representing an output current or output voltage of the fuel cell 110) supplied from a sensor group 21, and performs various computations necessary for carrying out the control. For example, the controller 20 computes a system-request power. The system-request power corresponds to the total value of vehicle driving power and auxiliary-apparatus power. The vehicle driving power is power supplied to the motor 15. The auxiliary-apparatus power includes, e.g., power consumed by vehicle-mounted auxiliary apparatuses, power consumed by devices necessary for vehicle driving, and power consumed by devices arranged in an occupant space. The vehicle-mounted auxiliary apparatuses include, e.g., a humidifier, air compressor, hydrogen pump and coolant pump. The devices necessary for vehicle driving include, e.g., a change gear, wheel control device, steering device and suspension device. The devices arranged in an occupant space include, e.g., an air-conditioning device, illumination device and audio equipment.

After computing the system-request power, the controller 20 determines an output power distribution ratio of the fuel cell 10 and the battery 13 and computes power generation command values in accordance with the respective request powers for the fuel cell 10 and the battery 13. In order to obtain the computed request power for the fuel cell 10, the controller 20 outputs the command CVfc to the first converter 11 to control the output voltage Vfc of the fuel cell 10. Also, in order to obtain the computed request power for the battery 13, the controller 20 outputs the command CVin to the second converter 12 to control the input voltage Vin of the inverter 14. Further, in order to obtain a target torque T and a target number of revolutions N in accordance with the acceleration opening degree, the controller 20 outputs the command CVd to the inverter 14 to have the inverter 14 output the desired drive voltage Vd, thereby controlling the torque and number of revolutions of the motor 15.

(Functional Blocks)

The controller 20 can perform a motor driving method according to the present invention when computing the input voltage Vin of the inverter 14. More specifically, under operating condition required for the motor 15 (i.e., target torque T and target number of revolutions N), the controller 20 functions to determine the input voltage of the inverter 14 which minimizes the power loss of the motor 15, the first converter 11, the second converter 12 and the inverter 14 and to command the determined input voltage as a request voltage Vin for the inverter. Specifically, this is realized with the functional blocks shown below.

Figure 2:
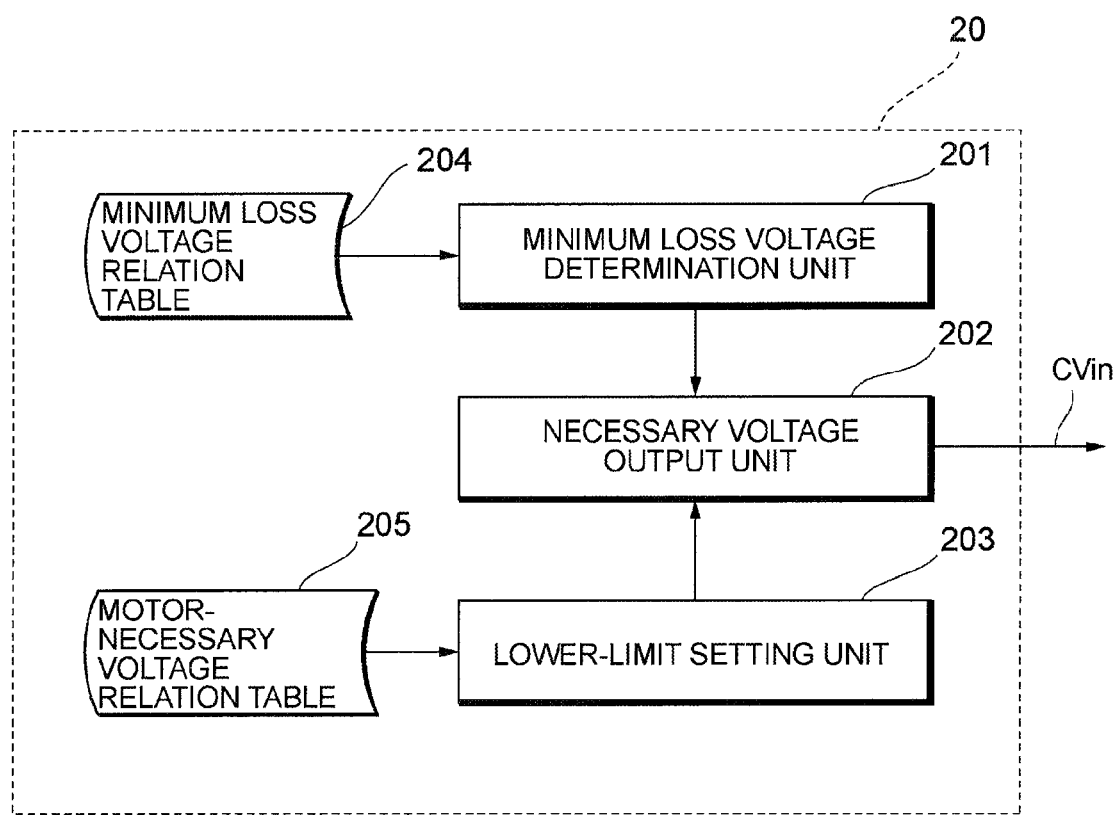
FIG. 2 is a functional block diagram for carrying out motor drive control according to embodiment 1.

FIG. 2 is a functional diagram for carrying out motor drive control that is functionally realized in the controller 20. As shown in FIG. 2, the motor drive control of the invention includes a minimum loss voltage determination unit 201, a necessary voltage output unit 202, a lower-limit setting unit 203, a minimum loss voltage relation table 204 and a motor-necessary voltage relation table 205.

The minimum loss voltage determination unit 201 is a functional block for determining the input voltages of the inverter which minimize the respective power losses of the motor 15, the first converter 11, the second converter 12 and the inverter 14 under the operating condition (target torque T and target number of revolutions N) required for the motor 15. At this point, the minimum loss voltage determination unit 201 refers to the minimum loss voltage relation table 204 in which the input voltage of the inverter which minimizes the power loss is mapped, the input voltage varying in accordance with the operating condition of the motor 15.

The necessary voltage output unit 202 is a functional block for outputting the determined input voltage of the inverter which minimizes the power loss as the necessary voltage Vin for the inverter in the form of the command CVin.

The lower-limit setting unit 203 is a functional block for, in the determination above, when the input voltage of the inverter 14 which minimizes the power loss is smaller than an input voltage Vinmin of the inverter 14 which provides a necessary voltage for the motor under the operating condition required for the motor 15, outputting the input voltage Vinmin of the inverter which provides the necessary voltage for the motor as the necessary voltage Vin for the inverter 14. At this point, the lower-limit setting unit 203 refers to the motor-necessary voltage relation table 205 in which the input voltage Vinmin of the inverter 14 which provides the necessary voltage for the motor 15 is mapped, the input voltage Vinmin varying in accordance with the operating condition of the motor 15. When the input voltage of the inverter 14 which minimizes the power loss under the operating condition (target torque T and target number of revolutions N) required for the motor 15 is smaller than the input voltage Vinmin of the inverter 14 which provides the necessary voltage for the motor, the lower-limit setting unit 203 outputs the input voltage Vinmin of the inverter 14 which provides the necessary voltage for the motor 15 as the necessary voltage Vin for the inverter 14. In other words, a limiter with, as the lower limit, the necessary voltage Vmin for the motor 15 is set with respect to a minimum loss voltage Vloss. Hereinafter, the input voltage of the inverter 14 which provides the necessary voltage for the motor may be referred to as a "lower-limit voltage."

(Operation)

Figure 8:
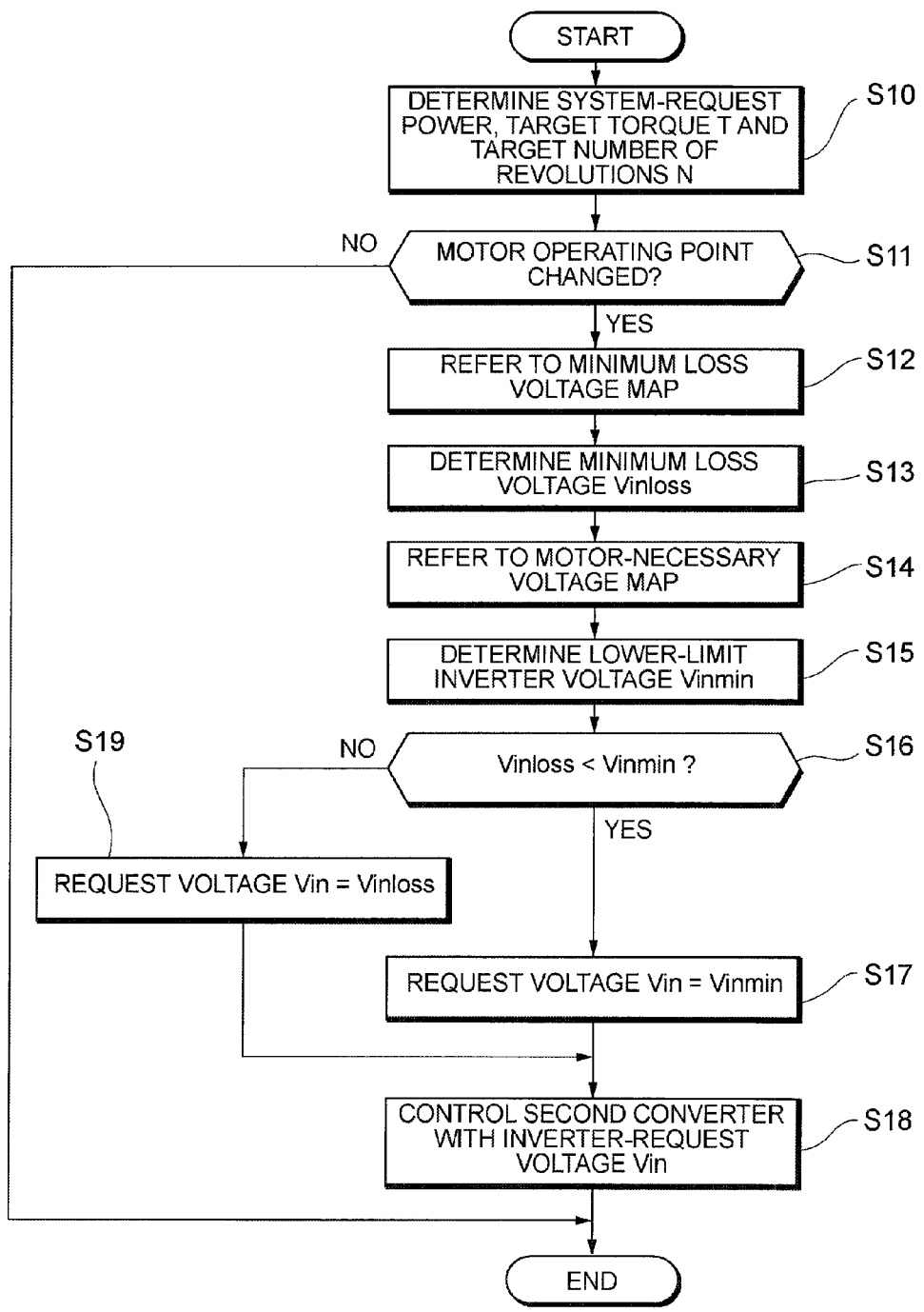
FIG. 8 is a flowchart of the motor drive control according to embodiment 1.

Next, the motor driving method of embodiment 1 which is realized with the functional blocks above will be described with reference to the flowchart of FIG. 8.

In step S10, the controller 20 first receives, as inputs, various signals (e.g., a signal representing an acceleration opening degree, a signal representing a vehicle speed, and a signal representing an output current or output voltage of the fuel cell 110) supplied from the sensor group 21. The controller 20 than computes a system-request power and a target torque T and a number of revolutions N, which serve as the operating condition required for the motor 15.

The processing proceeds to step S11, and the controller 20 judges whether or not the operating point of the motor 15, i.e., the target torque T or the number of revolutions N has been changed as a result of the above computation. If the judgment result indicates that the operating point of the motor 15 has been changed (YES), the processing proceeds to step S12, and the minimum loss voltage determination unit 201 of the controller 20 refers to the minimum loss voltage relation table 204. In the minimum loss voltage relation table 204, the input voltages of the inverter 14 which minimize the power losses for the respective power devices (motor 15, first converter 11, second converter 12 and inverter 14) are mapped in accordance with the operating condition of the motor 15.

Figure 3:
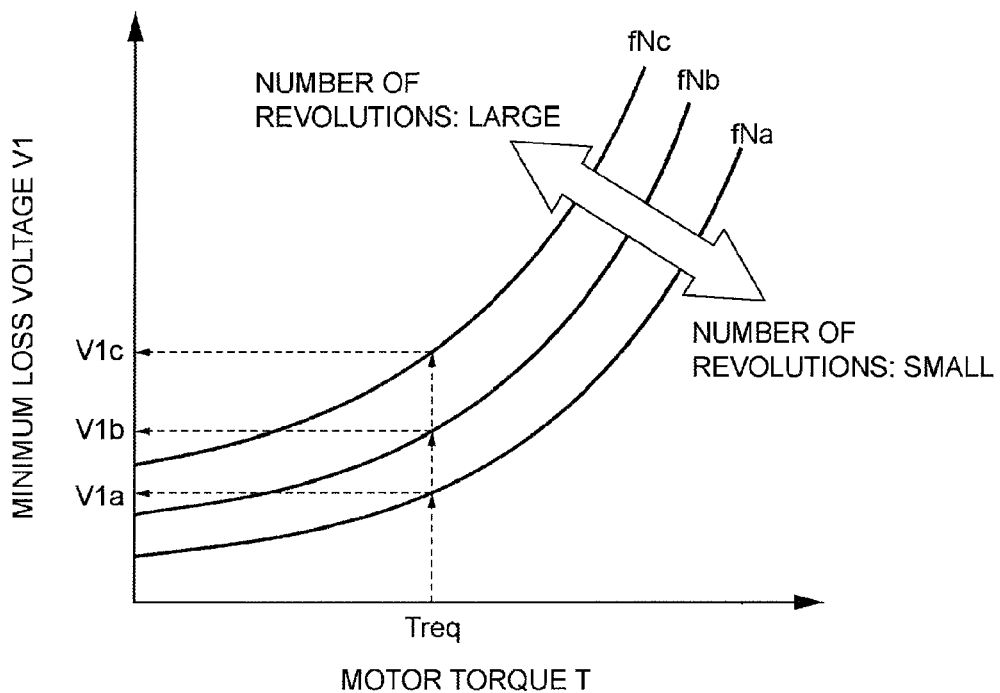
FIG. 3 is a relation diagram of minimum loss voltage V1 that minimizes the power loss of a first converter 11, minimum loss voltage V1 varying in accordance with the operating state (motor torque T) of a motor 15.

FIG. 3 is a relation diagram of minimum loss voltage V1 serving as the input voltage of the inverter 14 which minimizes the power loss of the first converter 11, the minimum loss voltage V1 varying in accordance with the operating state (target torque T and target number of revolutions N) of the motor 15. As shown in FIG. 3, as the target torque T of the motor 15 becomes larger, the input voltage of the inverter 14 which minimizes the power loss of the first converter 11 (minimum loss voltage V1) varies according to a predetermined relation curve. Also, as the number of revolutions N of the motor 15 becomes larger, the relation curve shifts. For example, assuming that the target torque is Treq, with the number of revolutions being Na, relation curve fNa is referred to, whereby minimum loss voltage V1$a$ is specified; with the number of revolutions being Nb, relation curve fNb is referred to, whereby minimum loss voltage V1$b$ is specified; and with the number of revolutions being Nc, relation curve fNc is referred to, whereby minimum loss voltage V1$c$ is specified.

Figure 4:
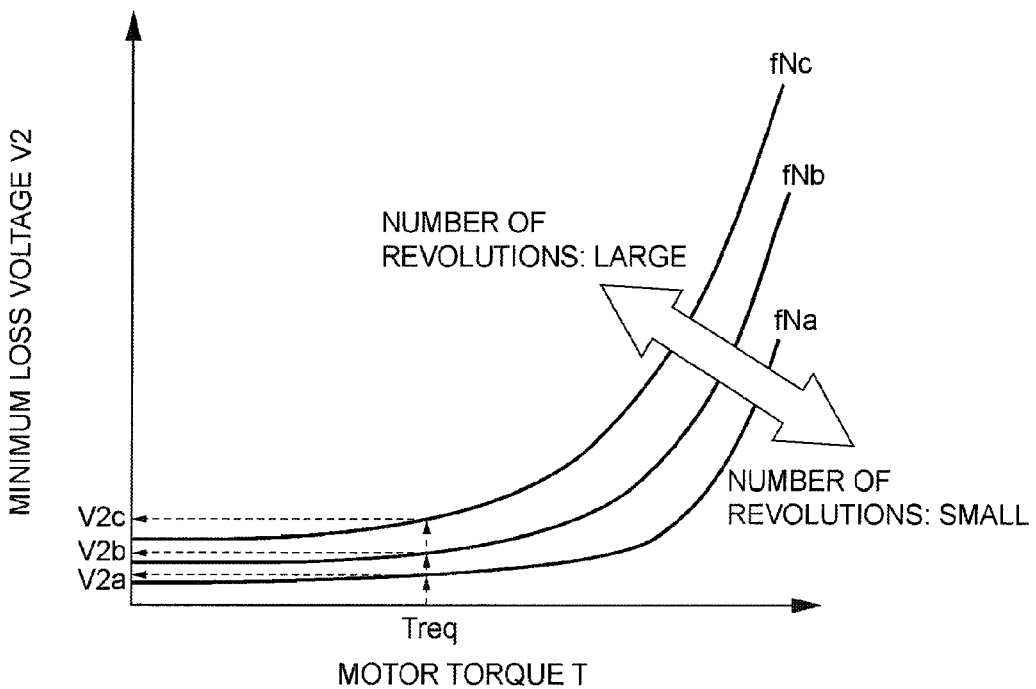
FIG. 4 is a relation diagram of minimum loss voltage V2 that minimizes the power loss of a second converter 12, minimum loss voltage V2 varying in accordance with the operating state (motor torque T) of the motor 15.

FIG. 4 is a relation diagram of minimum loss voltage V2 serving as the input voltage of the inverter 14 which minimizes the power loss of the second converter 12, the minimum loss voltage V2 varying in accordance with the operating state (target torque T and target number of revolutions N) of the motor 15. As shown in FIG. 4, as the target torque T of the motor 15 becomes larger, the input voltage of the inverter 14 which minimizes the power loss of the second converter 12 (minimum loss voltage V2) varies according to a predetermined relation curve. Also, as the number of revolutions N of the motor 15 becomes larger, the relation curve shifts. For example, assuming that the target torque is Treq, with the number of revolutions being Na, relation curve fNa is referred to, whereby minimum loss voltage V2$a$ is specified; with the number of revolutions being Nb, relation curve fNb is referred to, whereby minimum loss voltage V2$b$ is specified; and with the number of revolutions being Nc, relation curve fNc is referred to, whereby minimum loss voltage V2$c$ is specified.

Figure 5:
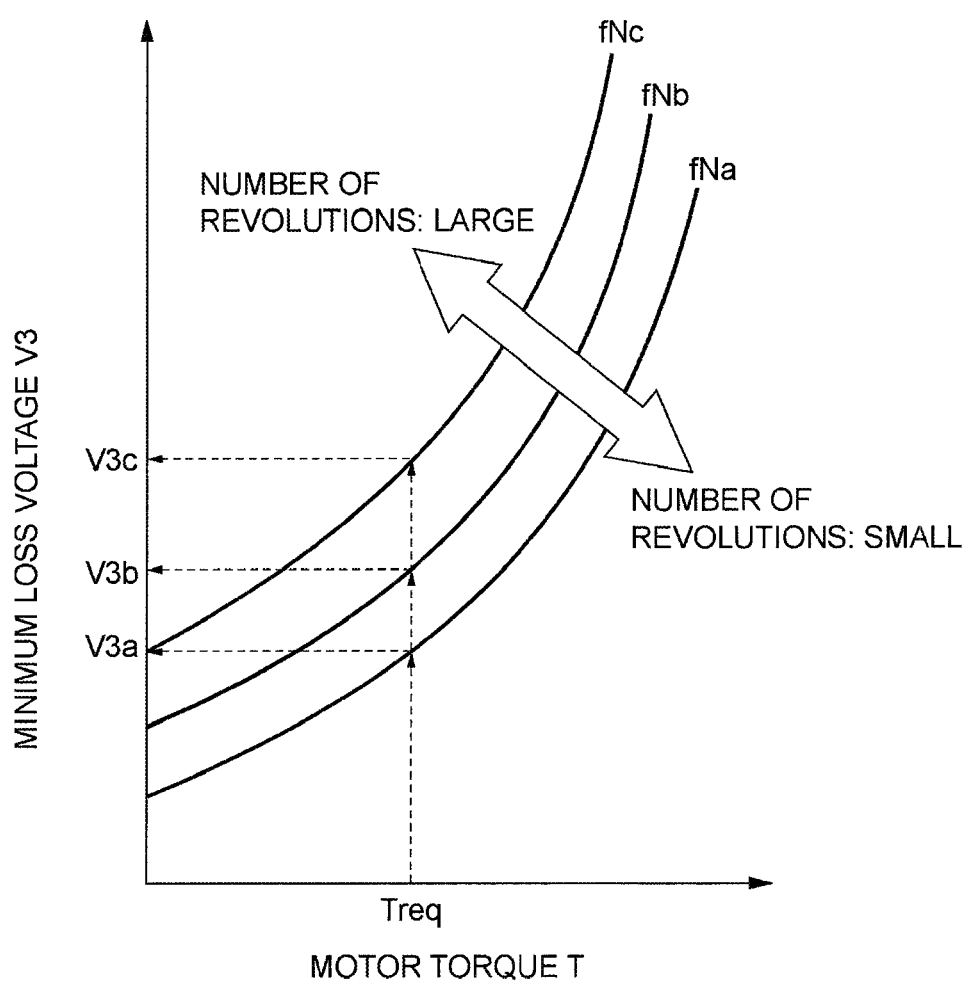
FIG. 5 is a relation diagram of minimum loss voltage V3 that minimizes the power loss of an inverter 14, minimum loss voltage V3 varying in accordance with the operating state (motor torque T) of the motor 15.

FIG. 5 is a relation diagram of minimum loss voltage V3 serving as the input voltage of the inverter 14 which minimizes the power loss of the inverter 14, the minimum loss voltage V3 varying in accordance with the operating state (target torque T and target number of revolutions N) of the motor 15. As shown in FIG. 5, as the target torque T of the motor 15 becomes larger, the input voltage of the inverter 14 which minimizes the power loss of the inverter 14 (minimum loss voltage V3) varies according to a predetermined relation curve. Also, as the number of revolutions N of the motor 15 becomes larger, the relation curve shifts. For example, assuming that the target torque is Treq, with the number of revolutions being Na, relation curve fNa is referred to, whereby minimum loss voltage V3$a$ is specified; with the number of revolutions being Nb, relation curve fNb is referred to, whereby minimum loss voltage V3$b$ is specified; and with the number of revolutions being Nc, relation curve fNc is referred to, whereby minimum loss voltage V3$c$ is specified.

The minimum loss voltage relation table 204 stores the relation curves as shown in FIGS. 3 to 5, which have been mapped to form a data table. Note that, if the above relation curves can be approximated using a relational expression, the input voltage of the inverter 14 which minimizes the power loss and which results from the computation using the relational expression may be used in place of the relation table.

The above applies also to the minimum loss voltage relation table concerning the motor 15.

The processing proceeds to step S13, and the minimum loss voltage determination unit 201 determines a minimum loss voltage Vinloss, which minimizes the entire power loss, based on the specified minimum loss voltages V1 to V3 of the plural power devices. For example, the minimum loss voltages V1, V2 and V3 may be compared to determine the highest voltage of the minimum loss voltages V1 to V3 as the minimum loss voltage Vinloss. Also, the lowest voltage of the minimum loss voltages V1 to V3 may be deemed as the minimum loss voltage Vinloss.

Further, the average value of the minimum loss voltages V1 to V3 may be obtained to determine the average value as the minimum loss voltage Vinloss. The average value of the minimum loss voltages can be expected to be a loss close to the minimum power loss in each of almost all of the power devices.

Furthermore, the weighted average of the minimum loss voltages V1 to V3 may be obtained to determine the calculated weighted average as the minimum loss voltage Vinloss in accordance with the power losses in the respective power devices. There is a difference in power loss between the power devices depending on the power capacities. Using the weighted average voltage based on the power losses allows the voltage of the power device having a large power loss to be given a large weight, whereby the voltage that minimizes the power loss of the entire system can be determined.

Instead of using the relation table in which the relation curves as shown in FIGS. 3 to 5 have been mapped, a relation table in which the voltage that minimizes the total power loss of the power devices may be referred to determine the input voltage of the inverter 14 which minimizes the power loss.

Moreover, if the relation curves can be approximated using a relational expression, the input voltage of the inverter 14 which minimizes the total power loss obtained through a computation using a relational expression in place of the relation table may be used.

Figure 6:
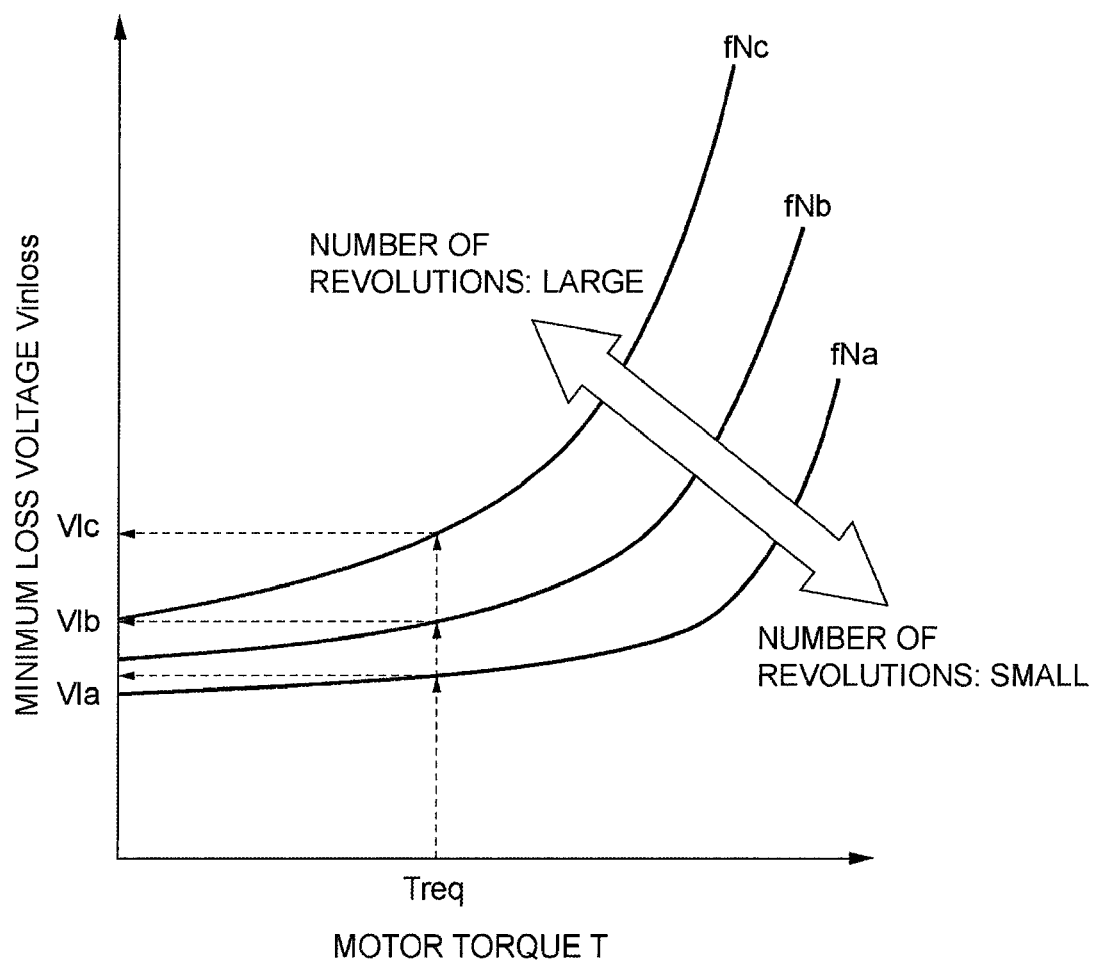
FIG. 6 is a diagram showing the relationship between the operating state (motor torque T) of the motor 15 and the total minimum power loss of the first converter 11, the second converter 12 and the inverter 14.

FIG. 6 is a relation diagram showing the relationship between the operating state (motor torque T and number of revolutions N) of the motor 15 and the total minimum power loss of the first converter 11, the second converter 12 and the inverter 14. The minimum loss voltage relation table 204 shown in FIG. 6 shows the relationship curves of the total power loss of the first converter 11, the second converter 12 and the inverter 14 in connection with the operating state of the motor 15.

As shown in FIG. 6, also when the respective power losses of the plural power devices are totaled, as the target torque T of the motor 15 becomes larger, the input voltage of the inverter 14 which minimizes the totaled power loss (minimum loss voltage Vinloss) varies according to a predetermined relation curve. This relation curve shifts as the number of revolutions N of the motor 15 becomes larger. For example, assuming that the target torque is Treq, with the number of revolutions being Na, relation curve fNa is referred to, whereby minimum loss voltage Vla is specified; with the number of revolutions being Nb, relation curve fNb is referred to, whereby minimum loss voltage Vlb is specified; and with the number of revolutions being Nc, relation curve fNc is referred to, whereby minimum loss voltage Vlc is specified.

The processing then proceeds to step S14, and the lower-limit setting unit 203 of the controller 20 refers to the motor-necessary voltage relation table 205. In the motor-necessary voltage relation table 205, the lower-limit inverter voltage Vinmin, which is the minimum voltage needed to be supplied to the motor 15, has been mapped in accordance with the operating condition of the motor 15. The lower-limit inverter voltage Vinmin is the minimum voltage necessary for stably driving the motor 15. In the motor-necessary voltage relation table 205, the relation as shown in FIG. 7 is mapped.

Figure 7:
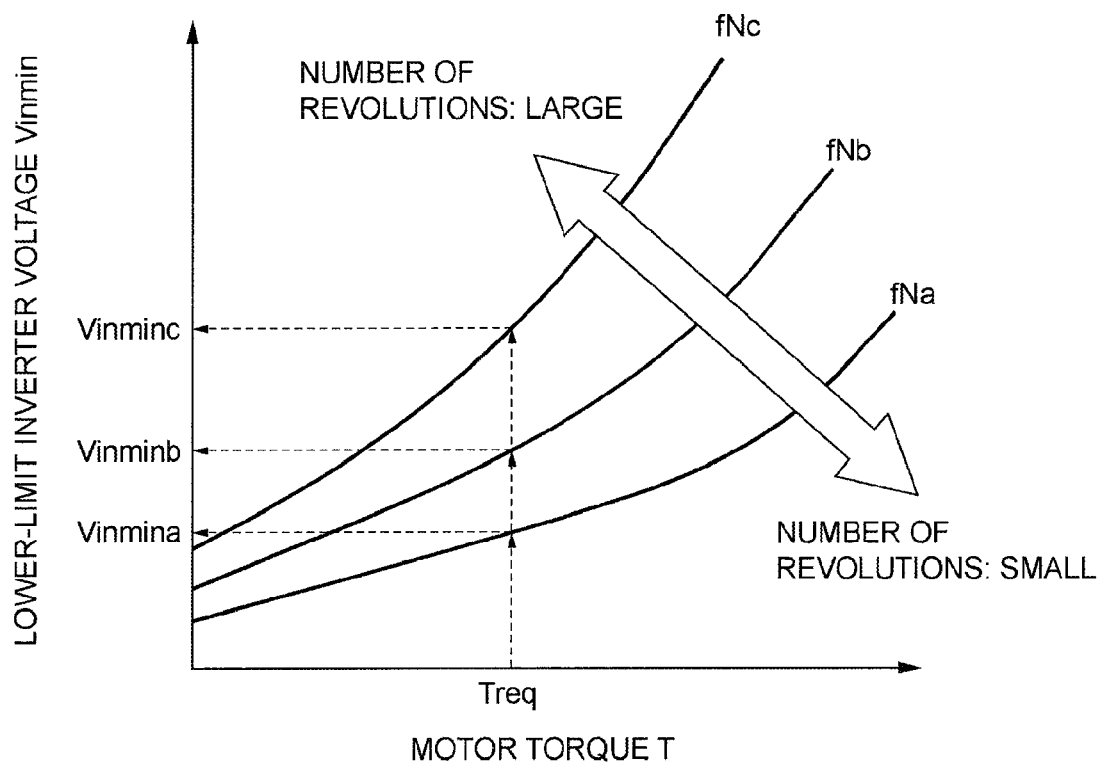
FIG. 7 is a diagram showing the relationship between the operating state (motor torque T) of the motor 15 and a motor-necessary voltage Vmin.

FIG. 7 is a relation diagram showing the relationship between the operating state (motor torque T and number of revolutions N) of the motor 15 and the lower-limit inverter voltage Vinmin. As shown in FIG. 7, as the target torque T of the motor 15 becomes larger, the lower-limit inverter voltage Vinmin also varies according to a predetermined relation curve. This relation curve shifts as the number of revolutions N of the motor 15 becomes larger. For example, assuming that the target torque is Treq, with the number of revolutions being Na, relation curve fNa is referred to, whereby lower-limit inverter voltage Vinmina is specified; with the number of revolutions being Nb, relation curve fNb is referred to, whereby lower-limit inverter voltage Vinminb is specified; and with the number of revolutions being Nc, relation curve fNc is referred to, whereby lower-limit inverter voltage Vinminc is specified.

Note that, if the lower-limit condition for the lower-limit voltage Vinmin of the inverter 14 can be specified using a relational expression, the lower-limit inverter voltage Vinmin may be specified through a computation using a relational expression in place of the above relation table.

The processing proceeds to step S15, and the lower-limit setting unit 203 refers to the motor-necessary voltage relation table 205 in which the relation as shown in FIG. 7 is mapped. The processing then proceeds to step S16, and the minimum loss voltage Vinloss determined in step S13 is compared with the lower-limit voltage Vinmin specified in step S14.

As a result of the comparison, if the minimum loss voltage Vinloss is below the lower-limit voltage Vinmin (YES), the processing proceeds to step S17, and then the necessary voltage Vin for the inverter 14 is set to the lower-limit voltage Vinmin.

On the other hand, if the minimum loss voltage Vinloss is equal to or higher than the lower-limit voltage Vinmin (NO), the processing proceeds to step S19, and the necessary voltage Vin for the inverter 14 is set to the minimum loss voltage Vinloss. This is the case where, since the lower-limit voltage Vinmin necessary for a stable operation of the motor 15 is ensured, the minimum loss voltage Vinloss can be set.

Lastly the processing proceeds to step S18, and the necessary voltage output unit 202 of the controller 20 outputs a command Cvin to control the second converter 12 so as to have the second converter 12 output the necessary voltage Vin to the inverter 14. With this processing, when the minimum loss voltage Vinloss is equal to or higher than the lower-limit voltage Vinmin, the minimum loss voltage Vinloss is input to the inverter 14, whereby the power loss of the entire system is significantly reduced. On the other hand, when the minimum loss voltage Vinloss is below the lower-limit voltage Vinmin, the lower-limit voltage Vinmin is input to the inverter 14, whereby priority is given to ensuring the stability of the motor 15.

Advantages of Embodiment 1

Embodiment 1 has the advantages indicated below.

(1) Embodiment 1 is configured to determine the minimum loss voltages Vinloss which minimize the power losses of the motor 15, the first converter 11, the second converter 12 and the inverter 14 under the operating condition (target torque T and number of revolutions N) required for the motor. This enables the driving of the motor 15 with a reduced power loss of the entire system.

(2) Embodiment 1 is configured such that, when the minimum loss voltage Vinloss is smaller than the lower-limit voltage Vinmin, the lower-limit voltage Vinmin is output as the input voltage Vin of the inverter 14. Therefore, the operating state of the motor can be maintained stably.

(3) Embodiment 1 is configured to refer to the minimum loss voltage relation table 204 associated with the power devices, as shown in FIGS. 3 to 5. Therefore, the input voltage of the inverter 14 which minimizes the power loss in accordance with the operating condition of the motor 15 can be acquired easily.

(4) Embodiment 1 is configured to determine the input voltage of the inverter 14 which minimizes the total power loss of the motor 15, the first converter 11, the second converter 12 and the inverter 14 under the operating condition required for the motor. Therefore, the motor 15 can be driven with the minimum power loss of the entire system.

(5) Embodiment 1 is configured to refer to the minimum loss voltage relation table 204 in which the voltage which minimizes the total power loss of the power devices is mapped, as shown in FIG. 6. Therefore, the input voltage of the inverter 14 which minimizes the power loss in accordance with the operating condition of the motor 15 can be acquired easily.

(6) Embodiment 1 is configured to refer to the motor-necessary voltage relation table 205 as shown in FIG. 7 to determine the drive voltage Vd of the motor 15. Therefore, the necessary voltage Vmin for the motor 15 in accordance with the operating condition of the motor can be acquired easily.

Embodiment 2

Embodiment 2 relates to a configuration of holding a relation table with which an input voltage of an inverter which provides the minimum power loss in each power device and a motor-necessary voltage can be uniquely determined.

Embodiment 2 employs the same configuration of the fuel cell system 100 as in embodiment 1. Therefore, the same reference symbols are used, and the relevant explanation is omitted.

In embodiment 1, as shown in FIG. 2, the two-step judgment is made in which: the minimum loss voltage Vinloss is determined using the minimum loss voltage relation table 204 (see FIGS. 3 to 6), etc.; and the necessary voltage Vin for the inverter is determined using the motor-necessary voltage relation table (see FIG. 7). Embodiment 2 is different from embodiment 1 on the point that the minimum loss voltage relation table 204 and the motor-necessary voltage relation table 205 are integrated into one relation table.

Figure 9:
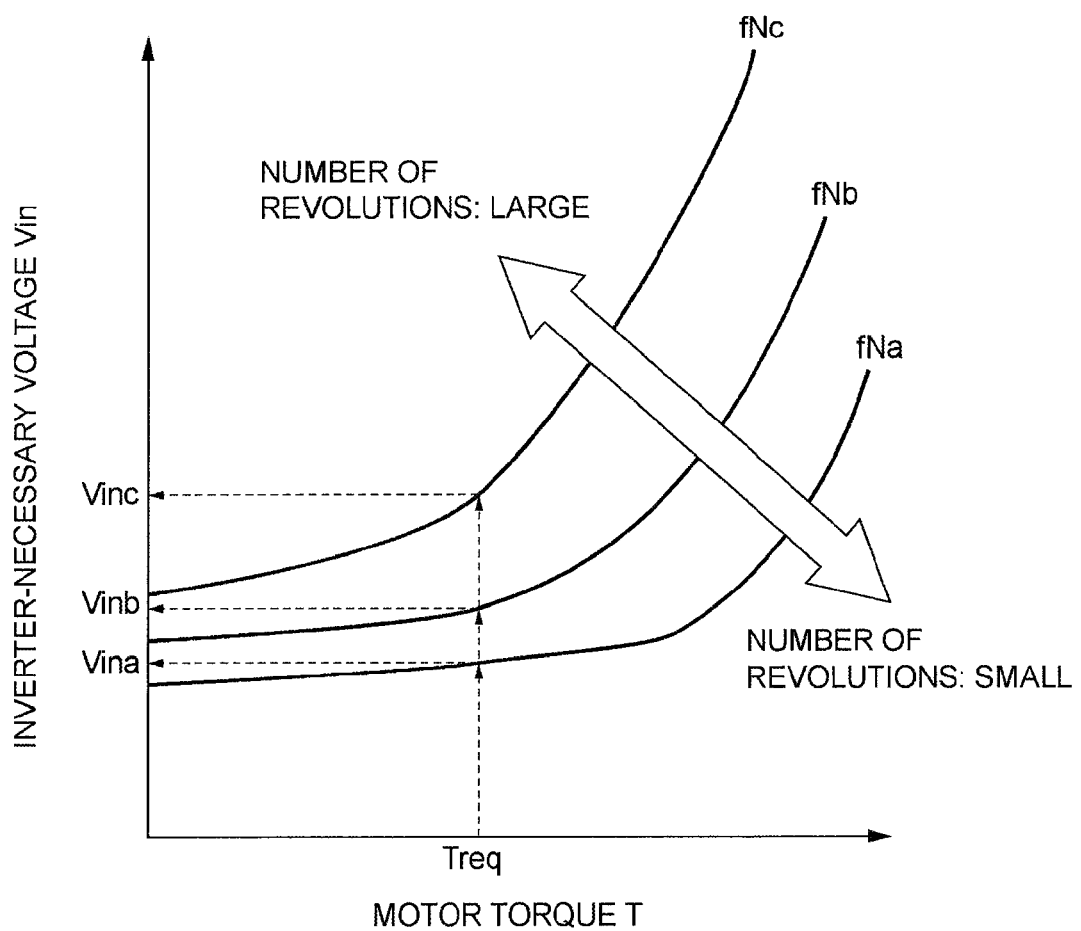
FIG. 9 is a diagram showing the relationship between the operating state (motor torque T) of the motor 15 and a motor drive voltage Vd according to embodiment 2.

FIG. 9 is a relation diagram used in embodiment 2, the diagram showing the relationship between the operating state (motor torque T and number of revolutions N) of the motor 15 and the necessary voltage Vin for the inverter 14. The relation curves shown in FIG. 9 are obtained by limiting the obtained minimum loss voltage Vinloss in accordance with the operating state of the motor 15 with, as a lower limit, the lower-limit voltage Vinmin of the inverter 14 which provides the necessary voltage for the motor 15 determined in accordance with the operating state of the motor 15. Accordingly, by referring to a motor drive voltage relation table in which the characteristic curves as shown in FIG. 9 are mapped, the inverter-necessary voltage Vin appropriate for the motor 15 can be specified directly from the operating state of the motor 15.

As shown in FIG. 9, even when the two relation tables in embodiment 1 are integrated, as the target torque T of the motor 15 becomes larger, the inverter-necessary voltage Vin varies according to a predetermined relation curve. This relation curve shifts as the number of revolutions N of the motor 15 becomes larger. For example, assuming that the target torque is Treq, with the number of revolutions being Na, relation curve fNa is referred to, whereby necessary voltage Vina is specified; with the number of revolutions being Nb, relation curve fNb is referred to, whereby necessary voltage Vinb is specified; and with the number of revolutions being Nc, relation curve fNc is referred to, whereby necessary voltage Vinc is specified. As is clear from the comparison between the characteristic curve of the minimum loss voltage Vinloss in FIG. 6, the characteristic curves of the lower-limit voltage Vinmin of the inverter 14 in FIG. 7 and the characteristic curves of the necessary voltage Vin for the inverter 14 in FIG. 9, the necessary voltage Vin is determined such that, while priority is given to the necessary voltage Vinmin under the operating condition of the motor 15 at which the minimum loss voltage Vinloss is below the lower-limit voltage Vinmin, priority is given to the minimum loss voltage Vinloss under the other operating conditions.

If the necessary voltage Vin in accordance with the driving condition of the motor 15 can be specified using a relational expression, the necessary voltage Vin for the inverter 14 may be specified through a computation using a relational expression in place of the above relation table.

Figure 10:
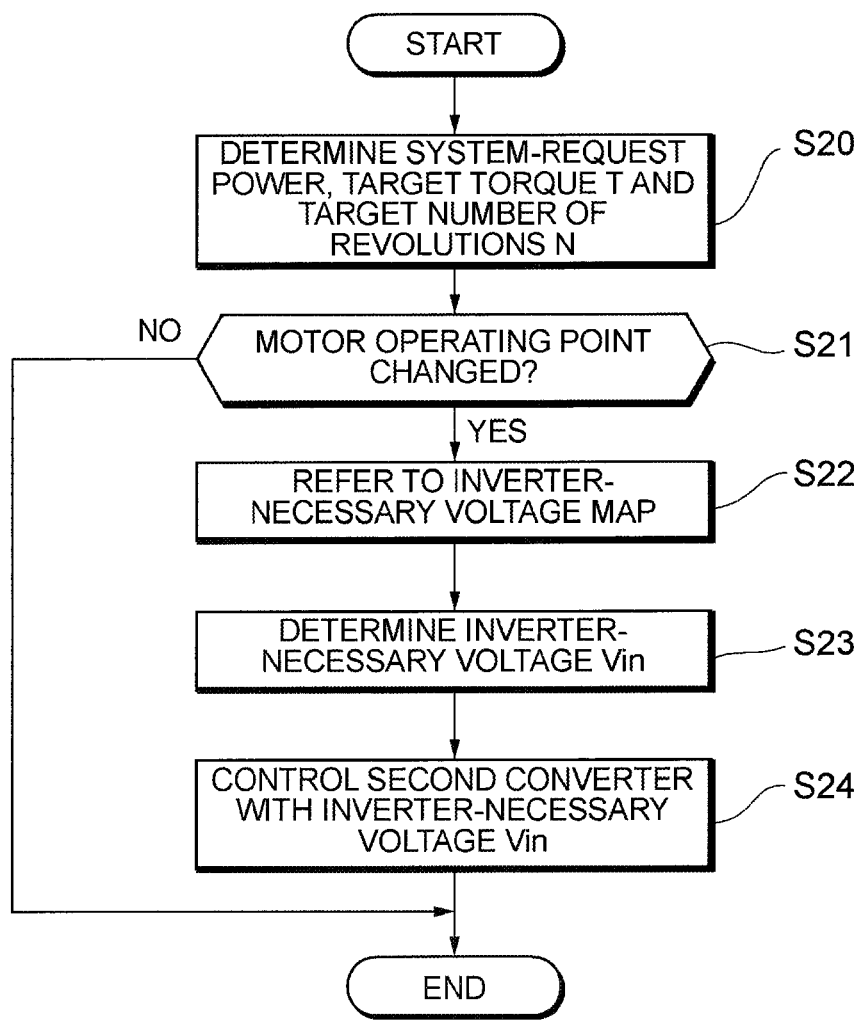
FIG. 10 is a flowchart of motor drive control according to embodiment 2.

Next, a motor driving method in embodiment 2 will be described with reference to the flowchart in FIG. 10.

In step S20, the controller 20 first receives, as inputs, various signals (e.g., a signal representing an acceleration opening degree, a signal representing a vehicle speed, and a signal representing an output current or output voltage of the fuel cell 110) supplied from the sensor group 21. The controller 20 than computes a system-request power and a target torque T and a number of revolutions N, which serve as the operating condition required for the motor 15.

The processing proceeds to step S21, and the controller 20 judges whether or not the operating point of the motor 15, i.e., the target torque T or the number of revolutions N has been changed as a result of the above computation. If the judgment result indicates that the operating point of the motor 15 has been changed (YES), the processing proceeds to step S22, and the controller 20 refers to the inverter-necessary voltage relation table described with reference to FIG. 9.

The processing then proceeds to step S23, and the controller 20 specifies the necessary voltage Vin for the inverter 14 directly from the inverter-necessary voltage relation table. The processing then proceeds to step S24, and the controller 20 outputs a command Cvin to have the second converter 12 output the necessary voltage Vin to the inverter 14. With this processing, the minimum loss voltage Vinloss is supplied to the inverter 14 where the minimum loss voltage Vinloss is equal to or higher than the lower-limit inverter voltage Vinmin that provides the motor-necessary voltage, thereby significantly reducing the power loss of the entire system. On the other hand, the lower-limit inverter voltage Vinmin is supplied to the inverter 14 where the minimum loss voltage Vinloss is below the lower-limit inverter voltage Vinmin that provides the motor-necessary voltage, whereby priority is given to ensuring the stability of the motor 15.

As described above, according to embodiment 2, the inverter-necessary voltage relation table is referred to in which the inverter-necessary voltage Vin which minimizes the power loss of each of the power devices (11, 12, 14, 15) and which provides the necessary voltage for the motor 15 is mapped, the inverter-necessary voltage Vin being equal to or higher than the lower-limit inverter voltage Vinmin. Accordingly, the optimum inverter-necessary voltage Vin can be determined by single computation or determination processing, and performing the determination processing is remarkably easy.

Note that, obviously, embodiment 2 follows the operation effects of embodiment 1 to the extent of not causing any inconsistency.

(Modifications)

The present invention is not limited to the embodiments above, and may be applied appropriately with modifications without departing from the spirit of the invention.

For example, in the embodiments above, the motor 15, the first converter 11, the second converter 12 and the inverter 14 have been given as examples of power devices whose power losses are considered. However, the power losses of the other components may be considered. For example, a configuration may be employed in which: the auxiliary inverter 18 shown in FIG. 1 is treated the same as the other power devices; and the minimum loss voltage Vinloss is determined based on the respective voltages that minimize the power losses of the power devices including the auxiliary inverter 18. With such a configuration, when the power loss of the auxiliary inverter 18 cannot be ignored relatively, the appropriate minimum loss voltage Vloss that also covers the auxiliary inverter 18 can be determined, thereby further reducing the power loss of the entire system.

Also, in the embodiments above, the power losses of all of the motor 15, the first converter 11, the second converter 12 and the inverter 14 have been considered. However, some of these power devices may be selected to determine the input voltage of the inverter which minimizes the power loss. For example, when the power loss of the first converter 11 is significantly large compared with the motor 15, the second converter 12 and the inverter 14, the voltage that minimizes the power loss of only the first converter 11 may be determined as the minimum loss voltage Vinloss of the entire system. Also, when the power loss of the inverter 14 is small compared with the other power devices, the minimum loss voltage Vinloss of the entire system may be determined with the power loss of the inverter 14 being ignored. This is because, if a power device with a relatively large power loss, i.e., a relatively large weight is put on a higher priority when reducing the power loss, this can attain the reduction in power loss of the entire system.

INDUSTRIAL APPLICABILITY

The fuel cell system and motor driving method of the invention may be applied not only to vehicles but also other mobile objects. As to the mobile objects, the invention may be applied to trains, ships, airplanes, submersible vehicles, etc. In addition to mobile objects such as vehicles, the invention may also be applied to stationary power supply systems and portable power supply systems.

REFERENCE SIGNS LIST

10: fuel cell, 11: first converter, 12: second converter, 13: battery, 14: inverter, 15: motor, 16: differential, 17: tires, 18: auxiliary inverter, 19: high-voltage auxiliary apparatus, 20: controller, 21: sensor group, 100: fuel cell system, 201: minimum loss voltage determination unit, 202: drive voltage output unit, 203: lower-limit drive voltage setting unit, 204: minimum loss voltage relation table, 205: motor-necessary voltage relation table, CVd, CVd2, CVfc, CVin: commands, N: target number of revolutions, fNa, fNb, fNc: relation curves, T: motor torque, Treq: target torque, V1, V1$a$, V1$b$, V1$c$, V2, V2$a$, V2$b$, V2$c$, V3, V3$a$, V3$b$, V3$c$: minimum loss voltages, Vbat: battery output voltage, Vd, Vd2: drive voltages, Vda, Vdb, Vdc: drive voltages, Vfc: fuel cell output voltage, Vin: inverter input voltage, V1$a$, V1$b$, V1$c$: minimum loss voltages, Vloss: minimum loss voltage, Vmin, Vmina, Vminb, Vminc: motor-necessary voltages.

What is claimed is:

1. A fuel cell system comprising:
an inverter connected to a motor;
a first converter that is connected between a fuel cell and the inverter;
a second converter that is connected between a power storage device and the inverter; and
a controller including a CPU, RAM, and ROM that is programmed to carry out an algorithm to control the first converter to set an output voltage of the fuel cell and the second converter to set an input voltage of the inverter,
an input voltage of the inverter which minimizes a power loss of at least one of the motor, the first converter, the second converter and the inverter under an operating condition required for the motor being determined, and the input voltage of the inverter which minimizes the power loss being output as a necessary voltage for the inverter, wherein
the second converter implements voltage conversion such that output voltage of the power storage device and input voltage of the inverter matches.

2. The fuel cell system according to claim 1, wherein, when the input voltage of the inverter which minimizes the power loss is smaller than a minimum input voltage of the inverter which provides a necessary voltage for the motor under the operating condition required for the motor, the input voltage of the inverter which provides the necessary voltage for the motor is output as the necessary voltage for the inverter.

3. The fuel cell system according to claim 2, wherein the necessary voltage for the inverter is determined by referring to a relation table in which the input voltage of the inverter which provides the necessary voltage for the motor is mapped, the input voltage varying in accordance with the operating condition for the motor.

4. The fuel cell system according to claim 1, wherein the input voltage of the inverter which minimizes the power loss is determined by referring to a relation table in which the input voltage of the inverter which minimizes a power loss is mapped regarding at least one of the first converter, the second converter and the inverter, the power loss varying in accordance with the operating condition for the motor.

5. The fuel cell system according to claim 1, wherein an input voltage of the inverter which minimizes the total power loss of the motor, the first converter, the second converter and the inverter under the operating condition required for the motor is determined.

6. The fuel cell system according to claim 5, wherein the input voltage of the inverter which minimizes the power loss is determined by referring to a relation table in which the input voltage of the inverter which minimizes the total power loss of the motor, the first converter, the second converter and the inverter is mapped, the total power loss varying in accordance with the operating condition for the motor.

7. The fuel cell system according to claim 1, further comprising an auxiliary inverter connected, in parallel with the inverter, with respect to the second converter, wherein
the input voltage of the inverter which minimizes the power loss under the operating condition required for the motor is determined, the input voltage further reflecting a power loss of the auxiliary inverter.

8. A fuel cell system comprising:
an inverter connected to a motor;

a first converter that is connected between a fuel cell and the inverter;

a second converter that is connected between a power storage device and the inverter; and a controller including a CPU, RAM, and ROM that is programmed to carry out an algorithm to control the first converter to set an output voltage of the fuel cell and the second converter to set an input voltage of the inverter, an input voltage of the inverter which minimizes a power loss of at least one of the motor, the first converter, the second converter and the inverter under an operating condition required for the motor and which is equal to or higher than a necessary voltage for the motor under the operating condition required for the motor being determined so as to be output as a necessary voltage for the inverter, wherein the second converter implements voltage conversion such that output voltage of the power storage device and input voltage of the inverter matches.

9. The fuel cell system according to claim 8, wherein the necessary voltage for the inverter is determined by referring to a relation table in which an input voltage of the inverter which minimizes the total power loss of the motor, the first converter, the second converter and the inverter and which is equal to or higher than the necessary voltage for the motor is mapped, the input voltage varying in accordance with the operating condition for the motor.

10. The fuel cell system according to claim 8, further comprising an auxiliary inverter connected, in parallel with the inverter, with respect to the second converter, wherein the input voltage of the inverter which minimizes the power loss under the operating condition required for the motor is determined, the input voltage further reflecting a power loss of the auxiliary inverter.

11. A fuel cell system comprising:

an inverter connected to a motor;

a first converter that is connected between a fuel cell and the inverter;

a second converter that is connected between a power storage device and the inverter; and a controller including a CPU, RAM, and ROM that is programmed to carry out an algorithm to control the first converter to set an output voltage of the fuel cell and the second converter to set an input voltage of the inverter, the controller further comprising:

a minimum loss voltage determination unit and a necessary voltage output unit, the controller programmed to determine an input voltage of the inverter which minimizes a power loss of at least one of the motor, the first converter, the second converter and the inverter under an operating condition required for the motor with the minimum loss voltage determination unit and programmed to output the input voltage of the inverter which minimizes the power loss as a necessary voltage for the inverter with the necessary voltage output unit, wherein the second converter implements voltage conversion such that output voltage of the power storage device and input voltage of the inverter matches.

12. The fuel cell system according to claim 11, further comprising a lower-limit setting unit that outputs, when the voltage of the inverter which minimizes the power loss is smaller than an input voltage of the inverter which provides a necessary voltage for the motor under the operating condition required for the motor, the input voltage of the inverter which provides the necessary voltage for the motor as the necessary voltage for the inverter.

13. A motor driving method for a fuel cell system provided with: an inverter connected to a motor; a first converter that is connected between a fuel cell and the inverter; a second converter that is connected between a power storage device and the inverter; and a controller including a CPU, RAM, and ROM that is programmed to carry out an algorithm to control the first converter to set an output voltage of the fuel cell and the second converter to set an input voltage of the inverter, comprising the steps of:

determining an input voltage of the inverter which minimizes a power loss of at least one of the motor, the first converter, the second converter and the inverter under an operating condition required for the motor; and outputting the input voltage of the inverter which minimizes the power loss as a necessary voltage for the inverter, wherein the second converter implements voltage conversion such that output voltage of the power storage device and input voltage of the inverter matches.

14. The motor driving method according to claim 13, further comprising the step of outputting, when the input voltage of the inverter which minimizes the power loss is smaller than a minimum input voltage of the inverter which provides a necessary voltage for the motor, the input voltage of the inverter which provides the necessary voltage for the motor as the necessary voltage for the inverter.

* * * * *